US012426002B2

(12) United States Patent
Lee et al.

(10) Patent No.: US 12,426,002 B2
(45) Date of Patent: Sep. 23, 2025

(54) METHOD AND APPARATUS FOR PROVIDING NETWORK SLICES IN WIRELESS COMMUNICATIONS SYSTEMS

(71) Applicant: Samsung Electronics Co., Ltd., Gyeonggi-do (KR)

(72) Inventors: Hoyeon Lee, Gyeonggi-do (KR); Dongeun Suh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 408 days.

(21) Appl. No.: 17/978,408

(22) Filed: Nov. 1, 2022

(65) Prior Publication Data
US 2023/0133453 A1 May 4, 2023

(30) Foreign Application Priority Data
Nov. 2, 2021 (KR) .................. 10-2021-0148913

(51) Int. Cl.
*H04W 48/02* (2009.01)
*H04W 60/04* (2009.01)
*H04W 76/30* (2018.01)

(52) U.S. Cl.
CPC .......... *H04W 60/04* (2013.01); *H04W 48/02* (2013.01); *H04W 76/30* (2018.02)

(58) Field of Classification Search
CPC ..... H04W 48/02; H04W 76/30; H04W 60/04; H04W 76/12; H04W 60/06; H04W 12/06
See application file for complete search history.

(56) References Cited

U.S. PATENT DOCUMENTS

| 2020/0322778 A1 | 10/2020 | Lee et al. |
| 2020/0413241 A1 | 12/2020 | Park et al. |
| 2021/0037426 A1* | 2/2021 | Zhu ................ H04W 76/12 |
| 2021/0282003 A1* | 9/2021 | Li ................ H04W 8/00 |

FOREIGN PATENT DOCUMENTS

| WO | WO 2018/141269 | 8/2018 |
| WO | WO 2018/199672 | 11/2018 |

OTHER PUBLICATIONS

3GPP TS 23.501 V17.2.0, 3GPP, 3rd Generation Partnership Project; Technical Specification Group Services and System Aspects; System Architecture for the 5G System (5GS); Stage 2 (Release 17), Sep. 2021, 534 pages.
International Search Report dated Feb. 13, 2023 issued in counterpart application No. PCT/KR2022/016941, 7 pages.

* cited by examiner

*Primary Examiner* — Anez C Ebrahim
(74) *Attorney, Agent, or Firm* — The Farrell Law Firm, P.C.

(57) ABSTRACT

The disclosure relates to a 5G or 6G communication system for supporting a higher data transmission rate. Provided are an access and mobility management function (AMF) and a method performed by an AMF, including receiving, from a terminal, a registration request message for a protocol data unit (PDU) session including information on a requested slice associated with the PDU session; determining whether the requested slice is allowed and whether the requested slice is for a network slice admission control (NSAC); if the requested slice is allowed for the terminal and is for the NSAC, determining whether the requested slice is exempt from the NSAC for the PDU session; and if the requested slice is exempt from the NSAC for the PDU session, transmitting, to the terminal, a registration accept message as a response to the registration request message.

14 Claims, 7 Drawing Sheets

METHOD AND APPARATUS FOR PROVIDING NETWORK SLICES IN WIRELESS COMMUNICATIONS SYSTEMS

CROSS-REFERENCE TO RELATED APPLICATION(S)

This application is based on and claims priority under 35 U.S.C. § 119 to Korean Patent Application No. 10-2021-0148913, which was filed in the Korean Intellectual Property Office on Nov. 2, 2021, the entire disclosure of which is incorporated herein by reference.

BACKGROUND

1. Field

The disclosure relates generally to a wireless communication system and, more specifically, to a method and apparatus for providing a network slice in a wireless communication system.

2. Description of Related Art

Fifth generation (5G) mobile communication technologies define broad frequency bands such that high transmission rates with possible new services, and can be implemented not only in sub 6 GHz bands such as 3.5 GHz, but also in above 6 GHz bands referred to as mmWave including 28 GHz and 39 GHz. In addition, it has been considered to implement 6G mobile communication technologies (referred to as beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power waving, non-terrestrial network (NTN) which is UE-satellite direct communication for providing coverage in an area in which communication with terrestrial networks is unavailable, and positioning.

The has also been ongoing standardization in air interface architecture/protocol regarding technologies such as Industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of $6^{th}$ generation (6G) mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure is to provide a method for determining whether a requested slice is allowed for a terminal during a terminal registration procedure.

Another aspect of the disclosure is to provide a method for processing a case in which the requested slice is exempted from a network slice admission control (NSAC). Another aspect of the disclosure is to provide a method for event notification and event subscription for notifying that a requested slice of a terminal, which has been unavailable, has become available during a terminal registration procedure.

Another aspect of the disclosure is to provide a processing method according to whether a network slice is exempted from an NSAC during a protocol data unit (PDU) session establishment procedure.

Another aspect of the disclosure is to provide a processing method of a PDU session establishing procedure in case that a requested slice of a terminal, which has been unavailable, is exempted from an NSAC, and has become available.

The technical subjects pursued in the disclosure may not be limited to the above-mentioned technical subjects, and other technical subjects which are not mentioned may be clearly understood, through the following descriptions, by those skilled in the art to which the disclosure pertains.

In accordance with an aspect of the disclosure, a method, performed by an access and mobility management function (AMF) in a communication system, is provided. The method includes receiving, from a terminal, a registration request message for a PDU session, the registration request message including information on a requested slice associated with the PDU session; determining whether the requested slice is allowed for the terminal and whether the requested slice is a slice for a NSAC; in case that the requested slice is allowed for the terminal and the requested slice is the slice for the NSAC, determining whether the requested slice is exempt from the NSAC for the PDU session; and in case that the requested slice is exempt from the NSAC for the PDU session, transmitting, to the terminal, a registration accept message as a response to the registration request message including information indicating that the requested slice is exempt from the NSAC for the PDU session.

In one embodiment, the determining whether the requested slice is exempted of the NSAC for the PDU session comprises: transmitting, to a network slice admission control function (NSACF), a request message for requesting whether the requested slice is allowed for the NSAC; receiving, from the NSACF, a response message including information indicating at least one of whether the requested slice is allowed for the NSAC or whether the requested slice is exempt from the NSAC for the PDU session; and determining whether the requested slice is exempt from the NSAC for the PDU session based on the information indicating the at least one of whether the requested slice is allowed for the NSAC or whether the requested slice is exempt from the NSAC for the PDU session.

In one embodiment, the determining whether the requested slice is allowed for the terminal and the requested slice is the slice for the NSAC comprises: transmitting, to a unified data management (UDM), a request message for requesting subscription information of the terminal; receiving, from the UDM, a response message including the subscription information of the terminal; and determining whether the requested slice is allowed for the terminal and the requested slice is the slice for the NSAC based on the subscription information of the terminal. In one embodiment, the method further comprises in case that the PDU session is released, determining that the requested slice is a rejected slice; and transmitting, to the terminal, information indicating that the requested slice is the rejected slice.

In one embodiment, the method further comprises transmitting, to the NSACF, a message for subscribing an event based on the information indicating at least one of whether the requested slice is allowed for the NSAC or whether the requested slice is exempt from the NSAC for the PDU session, the event is requesting information indicating that the requested slice is allowed when the requested slice is to be allowed based on a number of terminals for the requested slice; receiving, from the NSACF, information indicating that the requested slice is allowed; determining that the requested slice is allowed based on the information and discarding the information indicating that the requested slice is exempt from the NSAC for the PDU session; and transmitting, to the terminal, information indicating that the requested slice is allowed.

In one embodiment, the method further comprises receiving, from the terminal, a request message for establishing a new PDU session including the information on the requested slice; in case that the requested slice is exempt from the NSAC for the PDU session, determining that the new PDU session is not allowed for the requested slice; and transmitting, to the terminal, a reject message as a response to the request message.

In one embodiment, the method further comprises receiving, from the terminal, a request message for establishing a new PDU session, the request message including the information on the requested slice; determining that the requested slice is allowed for the new PDU session; and transmitting, to the terminal, an accept message as a response to the request message.

Another aspect of the disclosure provides an AMF in a communication system, including a transceiver and a controller coupled with the transceiver and configured to receive, from a terminal, a registration request message for a PDU session, the registration request message including information on a requested slice associated with the PDU session; determine whether the requested slice is allowed for the terminal and whether the requested slice is a slice for an NSAC; in case that the requested slice is allowed for the terminal and the requested slice is the slice for the NSAC, determine whether the requested slice is exempt from the NSAC for the PDU session; and in case that the requested slice is exempt from the NSAC for the PDU session, transmit, to the terminal, a registration accept message as a response to the registration request message including information indicating that the requested slice is exempt from the NSAC for the PDU session.

An embodiment of the disclosure is to provide a method for determining whether a requested slice is allowed for a terminal during a terminal registration procedure. In case that the requested slice is exempted of an NSAC, a processing method of same may be provided.

An embodiment of the disclosure may provide a method for event notification and event subscription for notifying a case that a requested slice of a terminal, which has been unavailable, becomes available again during a terminal registration procedure.

An embodiment of the disclosure may provide a processing method according to whether a network slice is exempted of a NSAC during PDU session establishment procedure.

Furthermore, an embodiment of the disclosure may provide a processing method of a PDU session establishing procedure in case that a requested slice of a terminal is unavailable when the slice is exempted of a NSAC and then an available event occurs again.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure are described in detail in conjunction with the accompanying drawings. Details of known functions or configurations incorporated herein are omitted when it is determined that the description of such details may make the subject matter of the disclosure unnecessarily unclear. The terms which will be described below are terms defined in consideration of the functions in the disclosure, and may be different according to users, intentions of the users, or customs.

Various advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. The same or like reference numerals designate the same or like elements.

An aspect of the disclosure relates to a method and apparatus for supporting various services in a wireless communication system. For example, the disclosure provides a technique for supporting various services by managing registration of a terminal that is to use a network slice in a wireless communication system.

In the following description, terms for identifying access nodes, terms for identifying access nodes, terms referring to network entities or network functions (NFs), terms referring to messages, terms referring to interfaces between network entities, terms referring to various identification information, etc., are illustratively used for the sake of convenience. Therefore, the disclosure is not limited by the terms as used below, and other terms referring to subjects having equivalent technical meanings may be used.

Although the disclosure is described using terms and names defined in the 3rd generation partnership project long term evolution (3GPP LTE) and 5G standards for the convenience of description, the disclosure is not limited by these terms and names, and may be applied in the same way to systems that conform other standards.

For convenience of explanation, a name of NF (e.g., an AMF, a session management function (SMF), and a network slicing selection function (NSSF)) will be used to indicate a target for exchanging information for access control and state management. Embodiments may be equally applied even when an NF is actually implemented as an instance (e.g., an AMF instance, an SMF instance, an NSSF instance, respectively, and the like).

Figure 1:
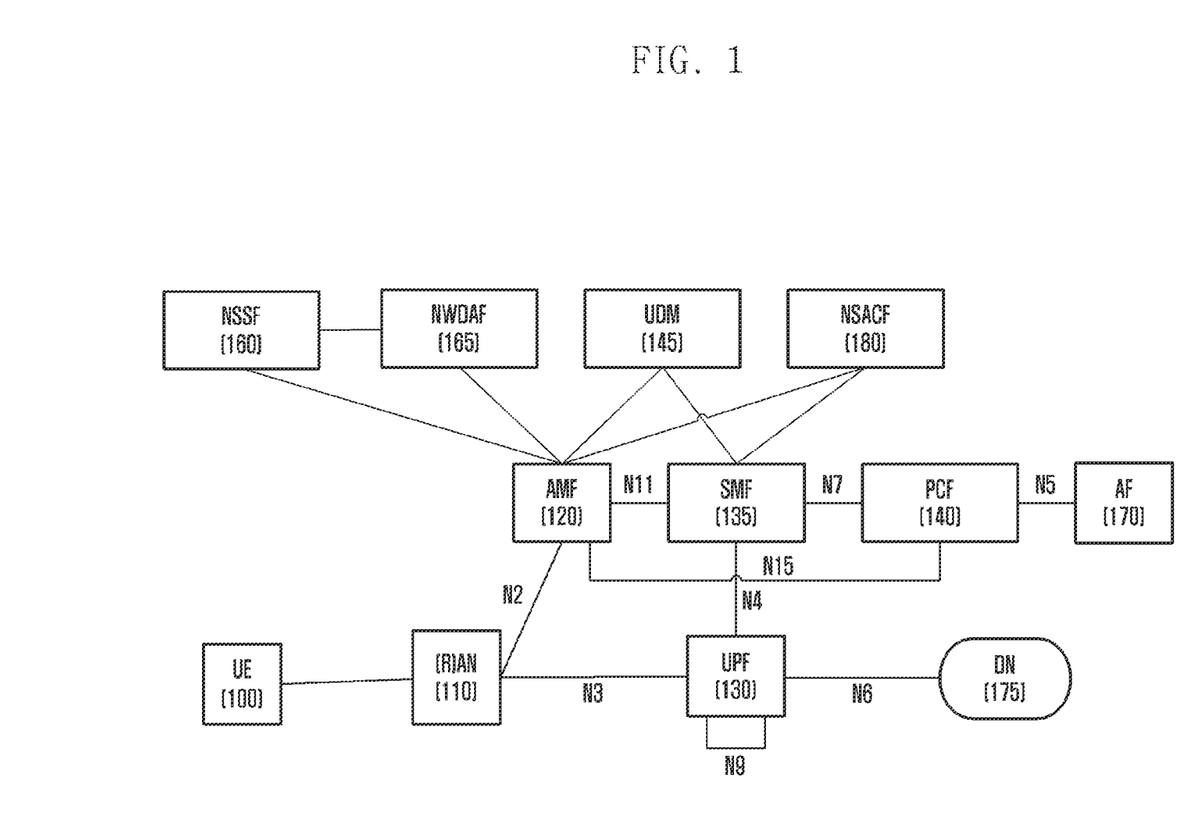
FIG. 1 illustrates a system structure of a 5G system (5GS) according to an embodiment.

FIG. 1 illustrates a system structure of a 5GS according to an embodiment.

Referring to FIG. 1, the 5GS may include a 5G core network, a base station, and a terminal, etc. The 5G core network includes an AMF 120, a SMF 135, a user plane function (UPF) 130, a policy control function (PCF) 140, a unified data management (UDM) 145, an NSSF 160, a network data analytics function (NWDAF) 165, an NSACF 180, and a non-3GPP function (N3F).

The terminal (or UE) 100 may access the 5G core network through the radio access network ((R)AN) base station 110. The access network base station 110 may support a 3GPP access network (e.g., NR, evolved universal terrestrial radio access (E-UTRA), etc.) or a non-3GPP access network (e.g., WiFi, etc.) type. The terminal 100 may be connected to the AMF 120 with via an N2 interface or the UPF 130 via an N3 interface through the base station 110. The base station 110 may be referred to as an access point (AP), an eNodeB (eNB), a 5G node, a gNodeB (gNB), or other terms having an equivalent technical meaning, as well as a base station. The N3F is an NF functioning as the N2 interface and the N3 interface termination for the terminal 100 accessing through an access network 111 not defined by 3GPP (non-3GPP access network) (e.g., WiFi or the like). The N3F may process N2 control plane signaling and an N3 user plane packet.

The AMF 120 is an NF configured to manage wireless network access and mobility with respect to the terminal, e.g., UE 100. The SMF 135 is an NF that manages a session for the terminal 100, and the session information includes quality of service (QoS) information, billing information, and packet processing information. The UPF 130 is an NF that processes user plane traffic and is controlled by the SMF 135. The PCF 140 is an NF that manages operator policy for providing services in a wireless communication system. The UDM 145 is an NF that stores and manages UE subscription information of the terminal 100. A unified data repository (UDR) is an NF that stores and manages data. The UDR may store terminal subscription information and provide terminal subscription information to UDM 145. In addition, the UDR may store operator policy information and provide operator policy information to the PCF 140.

The NWDAF 165 is an NF that provides analysis information for operation of a 5G system. The NWDAF 165 may collect data from other NFs or operations, administration and maintenance constituting the 5G system, analyze the collected data, and provide analysis results to other NFs. The NSACF 180 is an NF that monitors and controls the numbers of sessions and registered terminals of a network slice that is a target of an NSAC. The NSACF 180 may store configuration information with respect to numbers of maximum sessions and maximally registered terminals for each network slice therein.

For convenience of description, targets that exchange information for access control and state management are collectively described as NFs herein, and embodiments may be equally applied even in case NF is actually implemented as an instance (e.g., an AMF instance, an SMF instance, an NSSF instance, respectively, etc.).

Also, the instance may have a specific NF in the form of a software code, and may mean a state in which physical or/and logical resources are allocated from a computing system and executable in order to perform the function of NF in a physical computing system, for example, a specific computing system existing on the core network. Therefore, the AMF instance, the SMF instance, and the NSSF instance may mean that physical or/and logical resources are allocated and used for operations of the AMF 120, the SMF 135, and the NSSF 160 from a specific computing system existing on the core network, respectively. As a result, the AMF instance, the SMF instances, the NSSF instance, which are allocated with physical or/and logical resources to be used for operations of the AMF 120, the SMF 135, and the NSSF 160 from a specific computing system existing on the network, may perform the same operations as those of a case that the physical AMF 120, SMF 135, NSSF 160 devices exist. Therefore, in an embodiment, matters described as NF (the AMF 120, the SMF 135, the UPF 130, the NSSF 160, an NR repository function (NRF), service communication proxy (SCP), or the like) may be replaced with NF instances. Conversely, matters described as NF instances may be replaced with NF. Similarly, a matter described as a network slice may be replaced with a network slice instance. Conversely, a matter described as a network slice instance may be replaced with a network slice.

In an embodiment, in a 5G system defined by 3GPP, one network slice may be referred to as single-network slice selection assistance information (S-NSSAI). The S-NSSAI may include a slice/service type (SST) value and a slice differentiator (SD) value. The SST may represent the characteristics of services supported by the slice (e.g., eMBB, IoT, URLLC, V2X, etc.). The SD may be a value used as an additional identifier for a specific service referred to as SST.

The NSSAI may include one or more S-NSSAIs. Examples of an NSSAI include a configured NSSAI that is stored in the terminal, a requested NSSAI that is requested from the terminal, an allowed NSSAI that is permitted to be used by the terminal determined by the NF of the 5G core network (e.g., AMF, NSSF, or the like), and a subscribed NSSAI to which the terminal is subscribed, but is not limited to the above example.

The terminal 100 may be connected to the access network base station 110 and registered to a 5G system. Specifically, the terminal 100 may access the base station 110 to perform a terminal registration procedure to the AMF 120. During registration procedure, the AMF 120 may determine allowed NSSAI available for the terminal 100 connected to the base station 110 and allocate the allowed NSSAI to the terminal 100.

Figure 2:
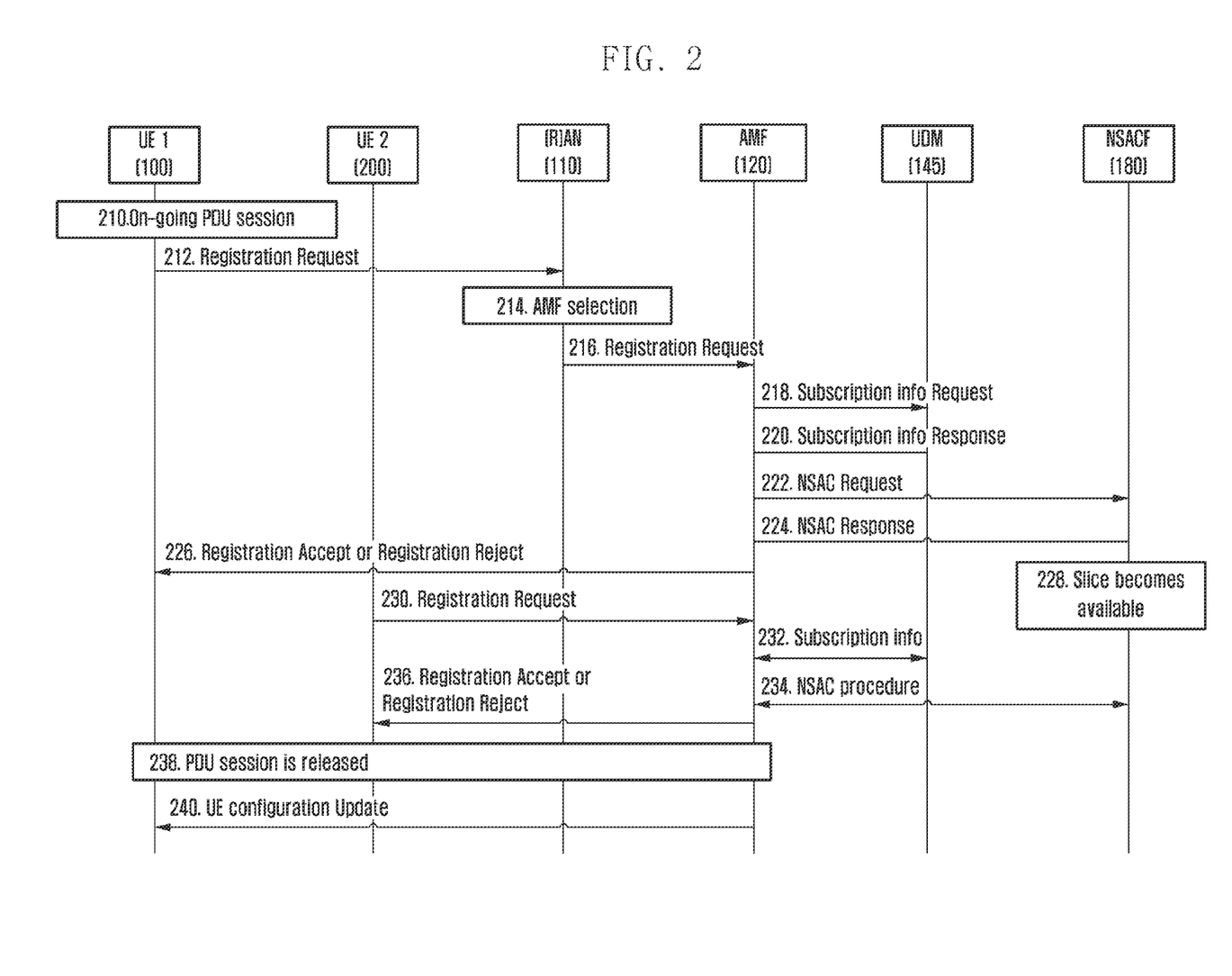
FIG. 2 illustrates a terminal registration procedure according to an embodiment.

FIG. 2 illustrates a terminal registration procedure according to an embodiment.

Referring to FIG. 2, the terminal 100 may be connected to the base station 110 to perform a registration procedure with the AMF 120.

In operation 210, the terminal 100 has a PDU session. The PDU session may have S-NSSAI related to the PDU session. For example, the terminal 100 may access an evolved packet core (EPC) to establish a PDN connection (PDU session). The terminal 100 using the PDN connection (PDU session) in the EPC may move to a 5G core (5GC).

In operation 212, the terminal 100 having moved to the 5GC may transmit the registration request message to the base station 110 to continuously use the PDN connection (PDU session) established in the EPC in the 5GC by registering same to the 5GC.

In operation 212, the terminal 100 may access the base station 110 to transmit a registration request message to the base station 110. The registration request message may include a requested slice (requested NSSAI) to be used by the terminal 100. The terminal 100 may include an S-NSSAI associated with the PDN connection (PDU session) to the requested slice in order to continuously use the PDN connection (PDU session) established in the EPC in the 5GC by registering same to the 5GC by the terminal 100.

In operation 214, the base station 110, having received the registration request message, selects an AMF 120 to which the registration request is transmitted, based on at least one of the requested NSSAI and a terminal identifier (ID) received from the terminal 100. For example, the base station 110 may select an AMF 120 which may support the requested NSSAI.

In operation 216, the base station 110 transmits the registration request message to the selected AMF 120. The AMF 120 may need to obtain terminal subscription information to process the registration request message.

In operation 218, the AMF 120 may request terminal subscription information from the UDM 145. A terminal registration information request message may include a terminal ID, e.g., subscription permanent identifier (SUPI), a 5G-globally unique temporary identifier (5G-GUTI), etc.

In operation 220, the UDM 145 returns terminal subscription information corresponding to the terminal ID to the AMF 120. The terminal subscription information may include subscribed slice information (subscribed S-NSSAIs) of the terminal 100. The terminal subscription information may also include S-NSSAI information for an NSAC.

The AMF 120 may determine an allowed NSSAI, based on at least one of a requested slice (requested NSSAI) of a terminal, a terminal subscription slice (subscribed S-NSSAIs), a terminal access network (3GPP AN), a network slice supported by the base station 110 (S-NSSAI supported by RAN), and an operator policy.

For example, when the requested slice (e.g., S-NSSAI) of a terminal is included in the terminal subscription slice and is included in a network slice supported by the base station 110, the AMF 120 may determine to include the requested slice of the terminal in an allowed slice (e.g., S-NSSAI).

The AMF 120 determines whether the S-NSSAI included in the allowed slice is S-NSSAI for an NSAC, based on at least one of configuration information stored in the AMF 120 and subscription information received from the UDM 145. For example, the configuration information or the subscription information may include information indicating which S-NSSAI is for an NSAC.

In operations 222 and 224, in case that the S-NSSAI included in the allowed slice is an S-NSSAI for the NSAC, the AMF 120 may determine slice availability from the NSACF 180 of the 5G core network before confirming that the allowed slice is allowed for the terminal 100. When the number of terminals registered in the S-NSSAI is less than a number of maximally registered terminals, the NSACF 180 may reply to the AMF 120 that the slice is available. In case of receiving that S-NSSAI is available from the NSACF 180, the AMF 120 may determine to include the S-NSSAI in the allowed slice.

As another example, based on the operator policy, the AMF 120 may determine that the S-NSSAI included in the allowed slice is for the NSAC but exempted from the NSAC. For example, the AMF 120 may determine that the S-NSSAI associated with PDN connection moved (i.e., handed over) from the EPC is exempt of the NSAC. The exemption of an NSAC may include notifying the NSACF 180 of S-NSSAI information exempt from the NSAC in a procedure of identifying slice availability from the NSACF 180 of operation 222 and operation 224. Alternatively, the exemption of the NSAC may include not performing a procedure with NSACF 180 of operation 222 and operation 224.

In operation 222, the AMF 120 may transmit an NSAC request message to the NSACF 180.

The NSAC request message may include at least one of S-NSSAI information for the NSAC, a terminal ID, and an indication indicating an increase or a decrease of the number of current terminals. The NSACF 180 processes the NSAC request message. For example, in case that the indication indicating increase of the number of terminals is included in the NSAC request message, the NSACF 180 compares a number of currently registered terminals and the number of maximally registered terminals and, in case that the number of currently registered terminals has not reached the number of maximally registered terminals, the number of currently registered terminals corresponding to the S-NSSAI being stored and managed by the NSACF 180 is increased. Also, the NSACF 180 stores the terminal ID registered in the S-NSSAI. In case that the number of currently registered terminals reaches the number of maximally registered terminals (or the number of currently registered terminals exceeds the number of maximally registered terminals) when the number of currently registered terminals is compared with the number of maximally registered terminals, the NSACF 180 determines that the number of currently registered terminals may no longer be increased. That is, the NSACF 180 may not successfully perform the request received from the AMF 120.

In another embodiment, the NSAC request message may include at least one of S-NSSAI information for the NSAC (or S-NSSAI information exempt from the NSAC), a terminal ID, an indication indicating the NSAC exemption. The NSACF 180 may process the request message. For example, the S-NSSAI included in the request message is exempt from the NSAC. Thus, the NSACF 180 may not change the number of currently registered terminals corresponding to the S-NSSAI. Also, the NSACF 180 may store the terminal ID for the S-NSSAI exempt from the NSAC.

In operation 224, the NSACF 180 transmits an NSAC response message to the AMF 120. The NSAC response message may include information indicating an NSAC request message processing result in operation 222. The NSAC response message may include at least one of target slice information (e.g., S-NSSAI, requested NSSAI, allowed NSSAI, subscribed S-NSSAI, etc.), availability of a target slice (e.g., an indication indicating availability or unavailability, a cause value, etc.). For example, in case that requested S-NSSAI exempt of the NSAC is processed, the NSACF 180 may include information indicating that the slice is available. Alternatively, the NSACF 180 may include information indicating that the S-NSSAI is exempt from the NSAC. In case that the number of currently registered terminals reaches the number of maximally registered terminals and is no longer able to increase the number of currently registered terminals, the NSAC response message may include information indicating that the slice is unavailable.

In operation 226, the AMF 120 may confirm the allowed slice according to availability of a slice received from the NSACF 180. For example, in case that information indicating that the slice (S-NSSAI) is available or that the S-NSSAI is exempted is received from the NSACF 180, the AMF 120 may include the slice (S-NSSAI) in the allowed slice. Alternatively, for example, in case that information indicating that the slice (S-NSSAI) is unavailable received from the NSACF 180, the AMF 120 may not include the slice (S-NSSAI) in the allowed slice. Additionally, the AMF 120 may include the slice (S-NSSAI) in a rejected slice (rejected NSSAI). Alternatively, in case that the NSACF 180 replies that the slice (S-NSSAI) is unavailable (failed) for the S-NSSAI that has determined to exempt the NSAC, since it has been determined to exempt NSAC even through the slice was unavailable, the AMF 120 may ignore the response (the slice is unavailable) received from the NSACF 180. That is, it has been determined to exempt the NSAC even though the slice is unavailable, the AMF 120 may include the slice (S-NSSAI) in the allowed slice. The AMF 120 may store, as a UE context, information indicating that the S-NSSAI is unavailable but included in the allowed slice. In addition, the UE context may include PDU session information (e.g., PDU session ID(s) and the like) for which NSAC is exempt.

In case that the AMF 120 receives information indicating that the S-NSSAI is exempt of the NSAC from the NSACF 180, the AMF 120 may store, as a UE context, the information indicating that the S-NSSAI is exempt of the NSAC. In addition, the UE context may include PDU session information (e.g., PDU session ID(s) and the like) for which NSAC is exempt. Accordingly, the AMF 120 may omit identifying slice availability with respect to the S-NSSAI.

In operation 226, the AMF 120 transmits a response message (registration accept or registration reject message) to the terminal 100 with respect to the registration request message received in operation 212. The registration accept message may include at least one of an allowed NSSAI and a rejected slice (rejected NSSAI). In case that no slice is available for the terminal, that is, that is there is no allowed slice, the AMF 120 may transmit the registration reject message. In case that the AMF 120 receives notification that the slice (S-NSSAI) is unavailable (or failed) for the S-NSSAI that has determined to exempt the NSAC from the NSACF 180, but it has been determined to exempt the NSAC even though the slice is unavailable, the AMF 120 may include the slice (S-NSSAI) in the allowed slice and include information indicating that the S-NSSAI is available in the allowed slice in the registration accept message. For example, the registration accept message may include slice information (S-NSSAI), an indication indicating availability only for the currently established PDU session associated with the slice, or an indication indicating an available PDU session (i.e., the currently established PDU session) associated with the slice, e.g., PDU session ID(s), etc.

The base station 110 may transmit the registration accept or registration reject message received from the AMF 120 to the terminal 100. The terminal 100 having received the registration accept message may store the allowed slice and/or rejected slice included in the registration accept message. The terminal 100 having received the allowed slice including S-NSSAI associated with the PDU session (PDN connection) from the AMF 120 in operation 210 may continuously use the PDU session associated with the S-NSSAI included in the allowed slice in a 5G network.

In addition, the terminal 100 may a PDU session by using an allowed slice received in following communications. In case that the registration accept message includes slice information (S-NSSAI), an indication indicating that availability only for the currently established PDU session associated with the slice, or an indication indicating an available PDU session (i.e., the currently established PDU session) associated with the slice (e.g., PDU session ID(s), etc.), the terminal 100 may not additionally request a PDU session associated with the slice.

In operation 228, after operation 222 and operation 224, the number of currently registered terminals managed by the NSACF 180 may be reduced to less than the number of maximally registered terminals. For example, although, at a time point at which operation 222 to operation 224 are performed, the number of currently registered terminals managed by the NSACF 180 is equal to or greater than the number of maximally registered terminals so that it is determined that a slice may not be used by terminal 1 (UE 100), with respect to terminal 2 (UE 200) accessing after operation 228, as the number of currently registered terminals managed by the NSACF 180 is less than the number of maximally registered terminals, it may be determined that the use of a slice is possible.

In operation 230, terminal 2 (UE 200) may access the base station 110 to transmit a registration request message to the base station 110. The registration request message may include a requested slice (requested NSSAI) to be used by terminal 2 (UE 200). The requested slice of terminal 2 (UE 200) may include the same S-NSSAI as the requested slice of terminal 1 (UE 100).

The base station 110 having received the registration request message from terminal 2 (UE 200) may select an AMF 120 to which the registration request is transmitted, based on at least one of the requested NSSAI received from terminal 2 (UE 200) and a terminal ID of terminal 2 (UE 200). For example, the base station 110 may select an AMF 120 which may support the requested NSSAI.

The base station 110 may transmit the registration request message to the selected AMF 120.

In operation 232, the AMF 120 may need to obtain terminal subscription information to process the registration request message. The AMF 120 may request terminal subscription information from the UDM 145. A terminal registration information request message may include a terminal ID, e.g., SUPI, a 5G-GUTI, and the like.

The UDM 145 may reply with terminal subscription information corresponding to the terminal ID to the AMF 120. The terminal subscription information may include subscribed slice information (subscribed S-NSSAIs) of the terminal 100. The terminal subscription information may also include S-NSSAI information for an NSAC.

The AMF 120 may determine an allowed slice of terminal 2 (UE 200). The method for determining the allowed slice is the same as described regarding operation 220 and is not repeated for conciseness.

In operation 234, the AMF 120 may transmit a NSAC request message to the NSACF 180.

The NSAC request message may include at least one of S-NSSAI information for the NSAC, a terminal ID, and an indication indicating increase or decrease of the current number of terminals. For example, the AMF 120 to add the S-NSSAI to the allowed slice of terminal 2 (UE 200) (i.e., the S-NSSAI to be allowable for terminal 2 (UE 200)) may include an indication indicating an increase in the current number of terminals.

The NSACF 180 may process the NSAC request message. For example, in case that the indication indicating increase of the number of terminals is included in the NSAC request message, the NSACF 180 may compare a number of currently registered terminals and the number of maximally registered terminals and in case that the number of currently registered terminals has not reached the number of maximally registered terminals, increase the number of currently registered terminals corresponding to the S-NSSAI being stored and managed by the NSACF 180. The NSACF 180 may also store the terminal ID registered in the S-NSSAI.

The NSACF 180 may transmit an NSAC response message to the AMF 120. The NSAC response message may include information indicating an NSAC request message processing result in operation 234. The NSAC response message may include at least one of target slice information (e.g., S-NSSAI, requested NSSAI, allowed NSSAI, subscribed S-NSSAI, etc.), and an availability of a target slice (e.g., an indication indicating availability or unavailability, a cause value, etc.). For example, in case that a requested S-NSSAI exempt of the NSAC is processed, the NSACF 180 may include information indicating that the slice is available.

In operation 236, the AMF 120 may confirm the allowed slice according to availability of a slice received from the NSACF 180. For example, in case that information indicating that the slice (S-NSSAI) is available is received from the NSACF 180, the AMF 120 may include the slice (S-NSSAI) in the allowed slice.

The AMF 120 may transmit a response message (registration accept or registration reject message) to the terminal 100 with respect to the registration request message received in operation 230. The registration accept message may include at least one of allowed NSSAI and a rejected slice (rejected NSSAI).

The base station 110 may transmit the registration accept or registration reject message received from the AMF 120 to terminal 2 (UE 200). The terminal 200 having received the registration accept message may store the allowed slice and/or rejected slice included in the registration accept message. In addition, terminal 2 (UE 200) may establish a PDU session by using an allowed slice received in following communications.

In operation 238, terminal 1 (UE 100) having received, in operation 226, the allowed slice including S-NSSAI associated with the PDU session (PDN connection) from the AMF 120, in operation 210 terminal 1 (UE 100) may continuously use the PDU session associated with the S-NSSAI included in the allowed slice in a 5G network. Thereafter, terminal 1 (UE 100) may release the PDU session.

The AMF 120 may recognize that the terminal 100 releases the PDU session associated with the S-NSSAI exempt of the NSAC. For example, in case that a PDU session release request message is received from the terminal 100 or a PDU session update or PDU session release request message is received from an SMF serving a PDU session, the AMF 120 may determine that the PDU session is released, based on information (e.g., S-NSSAI and a PDU session ID) included in the message received from the terminal 100 or the SMF and information (e.g., S-NSSAI exempt of an NSAC, PDU session information associated with S-NSSAI exempt of an NSAC (e.g., PDU session ID(s) and the like) and the like) included in a UE context stored in the AMF 120. That is, for example, in case that the terminal 100 or the SMF requests a release of the PDU session associated with S-NSSAI exempt of an NSAC, the AMF 120 may determine that the PDU session is released.

In operation 240, the AMF 120 determines change of the allowed slice or rejected slice transmitted to the terminal 100 in operation 226. For example, the AMF 120 may have included the S-NSSAI exempt of the NSAC in the allowed slice in operation 226. The AMF 120 may determine that all PDU sessions associated with the S-NSSAI exempt of the NSAC are released in operation 238. Accordingly, PDU sessions associated with the S-NSSAI exempt of the NSAC no longer exist, and the AMF 120 may determine to exclude the S-NSSAI included in the allowed slice in operation 226 from the allowed slice. The AMF 120 may exclude the S-NSSAI of the NSAC from the allowed slice and include the S-NSSAI in the rejected slice. The AMF 120 may transmit a new allowed slice or rejected slice to the terminal 100.

Figure 3:
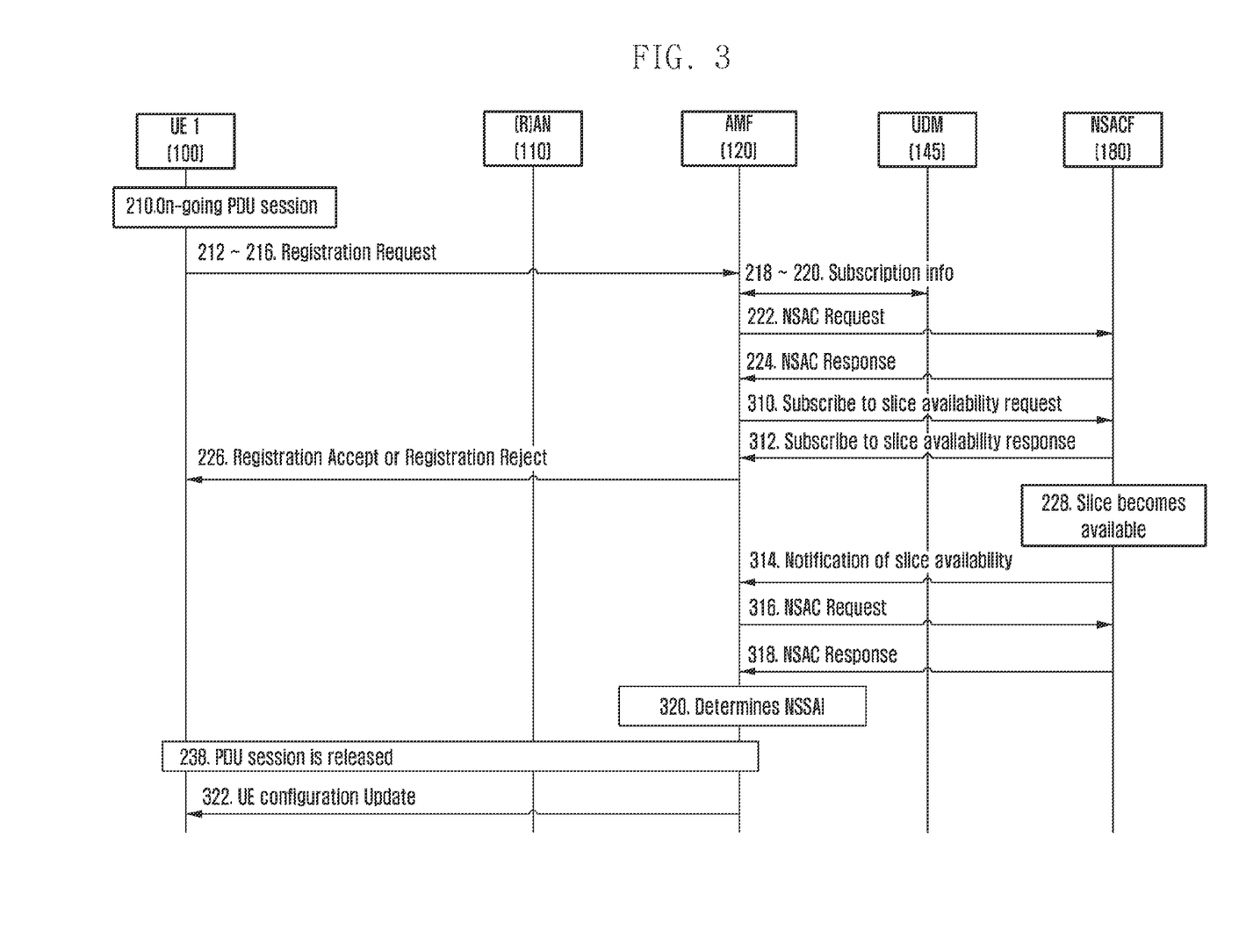
FIG. 3 illustrates a terminal registration procedure according to an embodiment.

FIG. 3 illustrates a terminal registration procedure according to an embodiment.

Referring to FIG. 3, the terminal 100 may be connected to the base station 110 to perform a registration procedure with the AMF 120.

Operation 210 to operation 226 of FIG. 3 correspond to operation 210 to operation 226 in FIG. 2, description of which is not repeated for conciseness.

In operation 310, when the NSAC response message received in operation 224 includes information indicating that the S-NSSAI is exempt of the NSAC or information indicating that the slice is not available, the slice indicating that the number of current registered terminals cannot be further increased since the number of currently registered terminals has reached the number of maximally registered terminals, the AMF 120 may transmit, to the NSACF 180, a message for subscribing to an event for receiving a notification message when the S-NSSAI becomes available. The message for subscribing to an event may include at least one of an identifier indicating an event to be subscribed, S-NSSAI, and a terminal ID.

In operation 312, the NSACF 180 having received the message for subscribing to an event may store information (e.g., an identifier indicating an event to be subscribed, S-NSSAI, a terminal ID) included in the request message. The NSACF 180 may transmit an event subscription response message to notify the AMF 120 that the request for event subscription has been processed. The NSACF 180 may monitor a number of currently registered terminals of the S-NSSAI compared to the number of maximally registered terminals.

Operation 310 and operation 312 may occur after operation 224 or after operation 226. Alternatively, operation 310 and operation 312 may be integrated into the messages of operation 222 and operation 224, respectively, and processed accordingly. In the case that operation 310 is integrated into the message of operation 222 and is processed accordingly, the AMF 120 may determine to progress an event subscription request together in case of the S-NSSAI exempt of the NSAC.

Operation 228 of FIG. 3 is the same as operation 228 shown in FIG. 2 and is not repeated for conciseness.

In operation 314 of FIG. 3, in case that a number of currently registered terminals registered in the S-NSSAI managed by the NSACF 180 is less than the number of maximally registered terminals, the NSACF 180 may notify the AMF 120 that the S-NSSAI is available.

The NSACF 180 may also increase the number of currently registered terminals corresponding to the S-NSSAI stored/managed by the NSACF 180. The NSACF 180 may add a terminal ID received in operation 310 to a terminal list registered in the S-NSSAI. In case that the NSACF 180 performs the additional operation, operation 316 and operation 318 may be omitted.

In operation 316, having received information that the S-NSSAI is available from the NSACF 180, the AMF 120 may allow the S-NSSAI related to the terminal 100. Thereafter, the AMF 120 may transmit an NSAC request message to the NSACF 180. The NSAC request message may include at least one of S-NSSAI information, a terminal ID, and an indication indicating increase or decrease of the number of current terminals. The NSACF 180 may process the NSAC request message. For example, the AMF 120 may include an indication of terminal number increase in the NSAC request message to allow the S-NSSAI related to the terminal 100. Since the number of currently registered terminals is less than the number of maximally registered terminals, the NSACF 180 may increase the number of currently registered terminals corresponding to the S-NSSAI stored/managed by the NSACF 180. Also, the NSACF 180 may store the terminal ID registered in the S-NSSAI.

In operation 318, the NSACF 180 transmits an message to the AMF 120. The NSAC response message may include information indicating an NSAC request message processing result in operation 316.

In operation 320, having received information that the S-NSSAI is available from the NSACF 180 in operation 314 to operation 318, the AMF 120 may allow the S-NSSAI related to the terminal 100. For example, even though the S-NSSAI is unavailable (or the number of currently registered terminals exceeds the number of maximally registered terminals) in operation 226, the AMF 120 may determine that the S-NSSAI is exempt of the NSAC and included in the allowed slice. The AMF 120 may store information related to determination as a UE context. The AMF 120, having received information that the S-NSSAI is available in operation 314, may allow the S-NSSAI related to the terminal 100. Accordingly, the AMF 120 may discard information (indication) indicating the S-NSSAI exempt of the NSAC stored in the UE context.

In operation 238, the terminal 100 may continuously use the PDU session associated with the S-NSSAI in a 5G network. Thereafter, the terminal 100 may release the PDU session. Operation 238 of FIG. 3 is the same as that of operation 228 of FIG. 2 and is not repeated for conciseness.

In operation 322, the AMF 120 may determine that all PDU sessions associated with the S-NSSAI exempt of the NSAC are released in operation 238. As the S-NSSAI has been determined to be continuously allowed to the terminal in operation 320, even though the PDU session associated with the S-NSSAI exempt of the NSAC no longer exists, AMF 120 may determine to continuously include the S-NSSAI in the allowed slice.

In an embodiment, operation 316 to operation 320 may occur after operation 238, with operation 310 to operation 312 and operation 314 omitted. That is, the AMF 120 having been notified that (all) PDU sessions associated with the S-NSSAI having become to be exempt of the NSAC in operation 238 are released may transmit an NSAC request message to the NSACF 180 to determine an allowed slice provided to the terminal 100 (operation 316). The NSACF 180 may replay an NSAC response message indicating that the slice is available to the AMF 120 (operation 318). The AMF 120 may determine to continuously include the S-NSSAI in the allowed slice, based on the response message received from the NSACF 180 (operation 320).

In case that the message in operation 226 includes information (e.g., slice information (S-NSSAI), an indication indicating availability only for the currently established PDU session associated with the slice, or an indication indicating an available PDU session (i.e., the currently established PDU session) associated with the slice (e.g., PDU session ID(s), etc.) indicating that the slice (S-NSSAI) may be included in the allowed slice, and the S-NSSAI is unavailable but included in the allowed slice, the AMF 120 may transmit a UE configuration update message in operation 322 to the terminal 100. The UE configuration update message may include the allowed slice including the S-NSSAI. In addition, the UE configuration update message may not include information indicating that the S-NSSAI is unavailable but included in the allowed slice. Alternatively, the UE configuration update message may include information indicating that the S-NSSAI is available.

In case that the message in operation 226 does not include information indicating that the slice (S-NSSAI) may be included in the allowed slice and the S-NSSAI is unavailable but included in the allowed slice, the AMF 120 may not transmit a UE configuration update message to the terminal 100. That is, the allowed slice transmitted in operation 226 and a newly determined allowed slice are the same. Thus, the AMF 120 may not transmit a UE configuration update message to the terminal 100.

Figure 4:
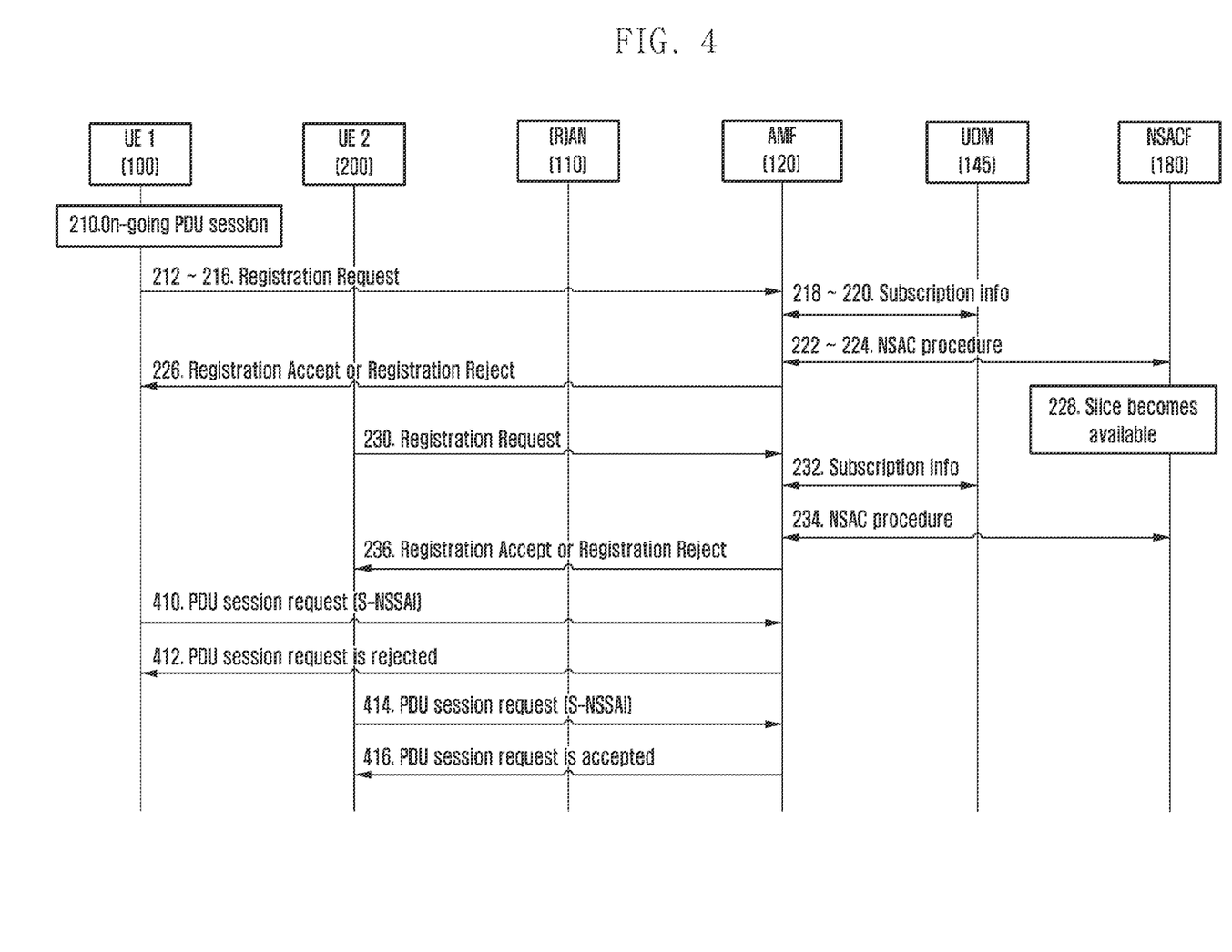
FIG. 4 illustrates a PDU session establishment procedure according to an embodiment.

FIG. 4 illustrates a PDU session establishment procedure according to an embodiment.

Referring to FIG. 4, terminal 1 (UE 100) performs a registration procedure with the AMF 120 according to operation 212 to operation 226 of FIG. 2. Similarly, terminal 2 (UE 200) may perform a registration procedure with the AMF 120 according to operation 230 to operation 236 shown in FIG. 2.

In operation 410, terminal 1 (UE 100) may transmit a PDU session request message to the AMF 120. The PDU session request message may include S-NSSAI.

In operation 412, based on at least one of an operator policy and a UE context of terminal 1 (UE 100), the AMF 120 may determine whether to approve the PDU session request. The AMF 120 may identify that the S-NSSAI included in the PDU session request message is included in an allowed slice of terminal 1 (UE 100). The AMF 120 may also identify that the S-NSSAI is a network slice exempt of an NSAC. Accordingly, the AMF 120 may determine that even though the S-NSSAI requested by terminal 1 (UE 100) is included in the allowed slice but a new PDU session establishment is not allowed, and may determine to reject the PDU session request. AMF 120 may transmit a PDU session reject message to terminal 1 (UE 100).

Terminal 1 (UE 100) may not establish a new PDU session.

In operation 414, terminal 2 (UE 200) may transmit a PDU session request message to the AMF 120. The PDU session request message may include S-NSSAI.

In operation 416, based on at least one of an operator policy and a UE context of terminal 2 (UE 200), the AMF 120 may determine whether to approve the PDU session request. The AMF 120 may identify that the S-NSSAI included in the PDU session request message is included in an allowed slice of terminal 2 (UE 200). Accordingly, the AMF 120 may determine to accept the PDU session requested by terminal 2 (UE 200). AMF 120 may transmit a PDU session accept message to terminal 2 (UE 200).

Terminal 2 (UE 200) may establish a PDU session and transmit/receive data traffic (use services) by using the PDU session.

Figure 5:
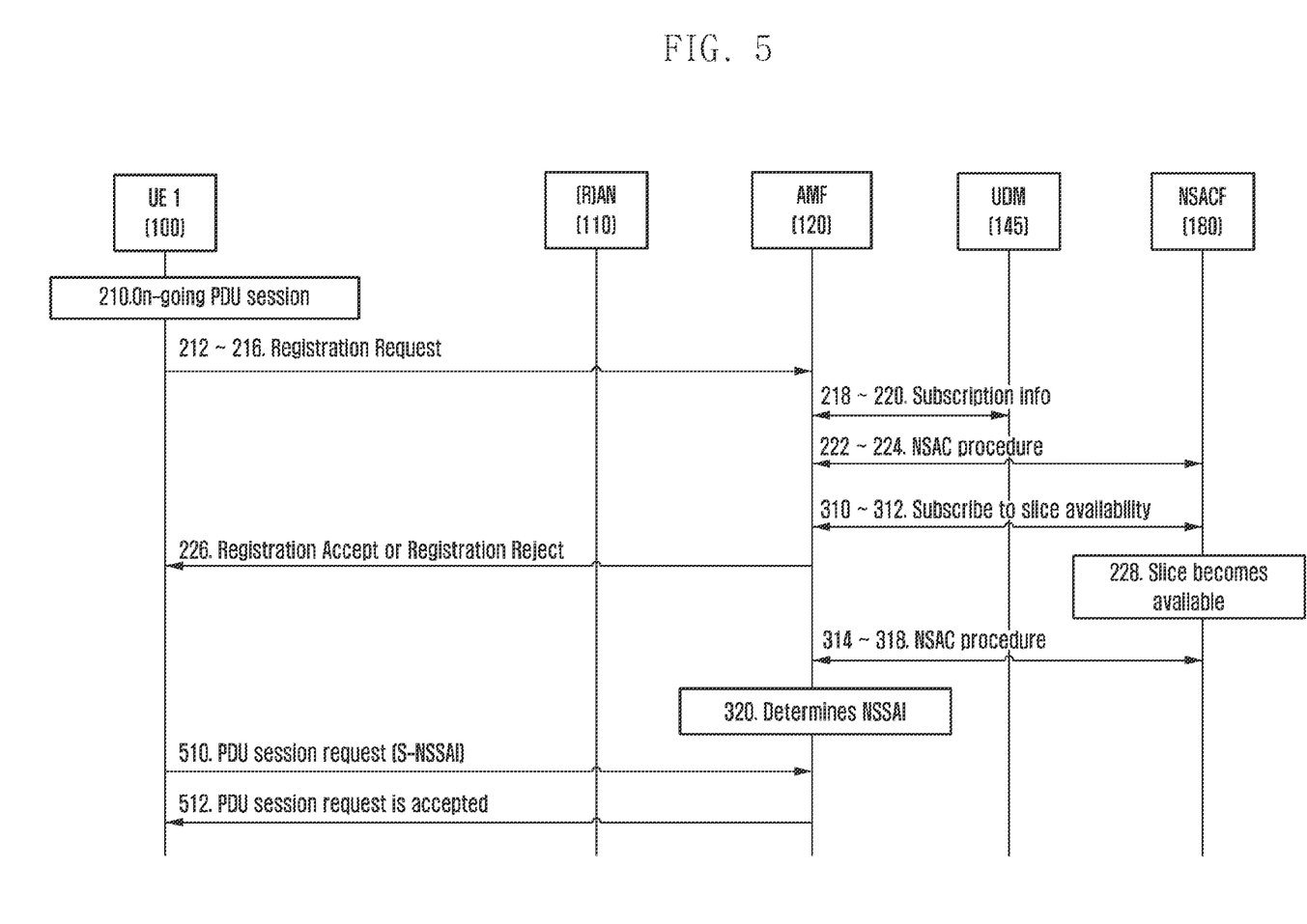
FIG. 5 illustrates a PDU session establishment procedure according to an embodiment.

FIG. 5 illustrates a PDU session establishment procedure according to an embodiment.

Referring to FIG. 5, the terminal 100 performs a registration procedure with the AMF 120 according to operation 212 to operation 226, as described in FIG. 2. Further, the AMF 120 and the NSACF 180 may perform event subscription with respect to whether the S-NSSAI is available according to a procedure of operation 310 to operation 320 of FIG. 3, and transmit and receive information on whether the S-NSSAI is available.

In operation 510, the terminal 100 transmits a PDU session request message to the AMF 120. The PDU session request message may include S-NSSAI.

In operation 512, based on at least one of an operator policy and a UE context of the terminal 100, the AMF 120 determines whether to approve the PDU session request.

The AMF 120 may identify that the S-NSSAI included in the PDU session request message is included in an allowed slice of the terminal 100. Further, the AMF 120 may identify whether the S-NSSAI is a network slice exempt of an NSAC. For example, the AMF 120 may discard information that the S-NSSAI is a network slice exempt of the NSAC from a UE context in operation 320, based on information received in operation 314 or operation 318. That is, the S-NSSAI included in the PDU session request message is included in the allowed slice of the terminal 100 and thus AMF 120 may determine to accept the PDU session requested by the terminal.

In an embodiment, the AMF 120 identifies that the S-NSSAI included in the PDU session request message is included in an allowed slice of the terminal 100. Further, the AMF 120 may identify that the S-NSSAI is a network slice exempt of an NSAC. Additionally, the AMF 120 may identify that the S-NSSAI exempt of the NSAC is available, based on information received in operation 314 or operation 318. Accordingly, the AMF 120 may determine to accept the PDU session requested by the terminal.

AMF 120 may transmit a PDU session accept message to the terminal 100.

The terminal 100 may establish a PDU session and transmit/receive data traffic (use services) by using the PDU session.

Figure 6:
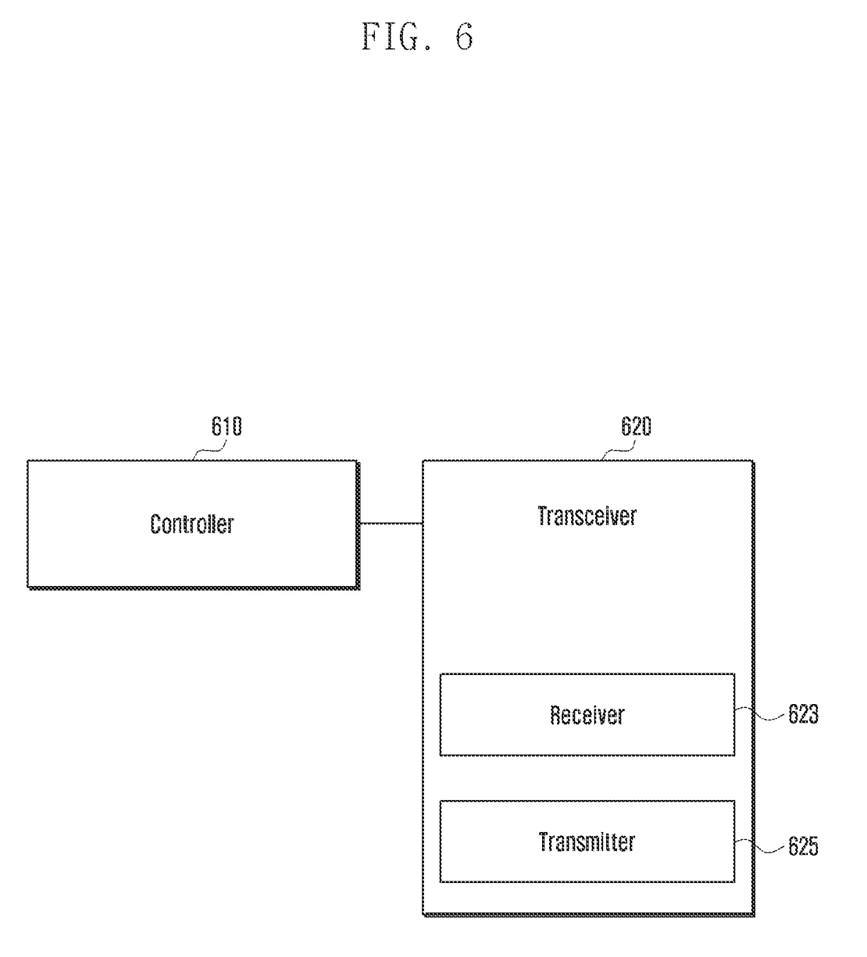
FIG. 6 illustrates a configuration of a terminal according to an embodiment.

FIG. 6 illustrates a configuration of a terminal according to an embodiment.

Referring to FIG. 6, the terminal may include a transceiver 620 and a controller 610 configured to control overall operations of the terminal. The transceiver 620 may include a transmitter 625 and a receiver 623.

The transceiver 620 may transmit/receive a signal to/from other network entities.

The controller 610 may control the terminal to perform at least one operation among the above-described embodiments. The controller 610 and the transceiver 620 do not necessarily have to be implemented in separate modules and may be implemented as a single unit such as a single chip. The controller 610 and the transceiver 620 may be electrically connected to each other. The controller 610 may be a circuit, an application-specific circuit, or at least one processor. In addition, operations of the terminal may be realized by including a memory device storing the corresponding program code in a predetermined component of the terminal.

Figure 7:
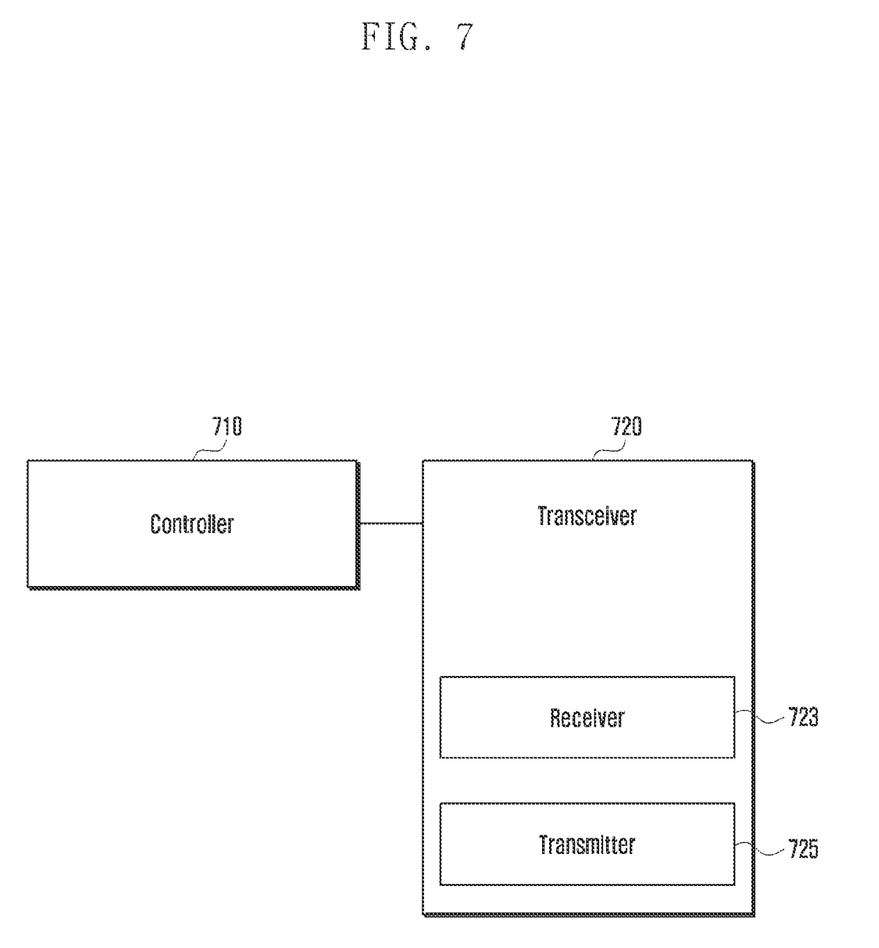
FIG. 7 illustrates a configuration of a network entity according to an embodiment.

FIG. 7 illustrates a configuration of a network entity according to an embodiment.

The network entity may include a network function according to system implementation.

Referring to FIG. 7, the network entity may include a transceiver 720 and a controller 710 configured to control overall operations of the network entity. The transceiver 720 may include a transmitter 725 and a receiver 723.

The transceiver 720 may transmit/receive a signal to/from other network entities.

The controller 710 may control the network entity to perform at least one operation among the above-described embodiments. The controller 710 and the transceiver 720 do not necessarily have to be implemented in separate modules and may be implemented as a single unit such as a single chip. The controller 710 and the transceiver 720 may be electrically connected to each other. The controller 710 may be, for example, a circuit, an application-specific circuit, or at least one processor. In addition, operations of the network entity may be realized by including a memory device storing the corresponding program code in a predetermined component of the network entity.

The network entity may correspond one of the base station, the AMF, the SMF, the UPF, the PCF, the NSSF, the NWDAF, the NSACF, the UDM, the AF, the DN, a UDR, an N3F, an NRF, and a SCP.

Configuration diagrams, as well as exemplary views of the control/data signal transmission method and the operation procedure illustrated in FIG. 1 to FIG. 6 are not intended to limit the scope of the disclosure. That is, it should not be construed that all constituent units, entities, or operation steps shown in FIG. 1 to FIG. 6 are elements for implementing the disclosure, and it should be understood that the disclosure may be implemented by only some elements without departing from the basic scope of the disclosure.

The above-described operations of a base station or a terminal may be implemented by providing a memory device storing corresponding program codes in a bast station or terminal device. That is, a controller of the base station or terminal device may perform the above-described operations by reading and executing the program codes stored in the memory device by means of a processor or central processing unit (CPU).

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by an access and mobility management function (AMF) in a communication system, the method comprising:
   receiving, from a terminal, a registration request message for a protocol data unit (PDU) session, the registration request message including information on a requested slice associated with the PDU session;
   determining whether the requested slice is a slice for a network slice admission control (NSAC);
   in case that the requested slice is the slice for the NSAC, determining whether the terminal of the requested slice is exempt from the NSAC for the PDU session;
   in case that the terminal of the requested slice is exempt from the NSAC for the PDU session, determining whether the requested slice is allowed for the terminal; and
   in case that the request slice is allowed for the terminal, transmitting, to the terminal, a registration accept message including information indicating that the requested slice is allowed.

2. The method of claim 1, wherein determining whether the terminal of the requested slice is exempt from the NSAC for the PDU session comprises:
   transmitting, to a network slice admission control function (NSACF), a request message for requesting whether the terminal of the requested slice is allowed for the NSAC;
   receiving, from the NSACF, a response message including information indicating at least one of whether the terminal of the requested slice is allowed for the NSAC or whether the terminal of the requested slice is exempt from the NSAC for the PDU session; and
   determining whether the terminal of the requested slice is exempt from the NSAC for the PDU session based on the information indicating the at least one of whether the terminal of the requested slice is allowed for the NSAC or whether the terminal of the requested slice is exempt from the NSAC for the PDU session.

3. The method of claim 2, further comprising:
   transmitting, to the NSACF, a message for subscribing to an event based on the information indicating at least one of whether the terminal of the requested slice is allowed for the NSAC or whether the terminal of the requested slice is exempt from the NSAC for the PDU session, wherein the event requests information indicating that the terminal of the requested slice is allowed when the requested slice is to be allowed;
   receiving, from the NSACF, the information indicating that the terminal of the requested slice is allowed based on a number of terminals for the requested slice;
   determining that the requested slice is allowed based on the number of terminals for the requested slice and discarding the information indicating that the requested slice is allowed based on the terminal of the requested slice is exempt from the NSAC for the PDU session; and
   transmitting, to the terminal, the information indicating that the requested slice is allowed.

4. The method of claim 3, further comprising:
   receiving, from the terminal, a request message for establishing a new PDU session, the request message including the information on the requested slice;
   determining that the requested slice is allowed for the new PDU session; and
   transmitting, to the terminal, an accept message as a response to the request message.

5. The method of claim 1, wherein determining whether the requested slice is the slice for the NSAC comprises:
   transmitting, to a unified data management (UDM), a request message for requesting subscription information of the terminal; and
   receiving, from the UDM, a response message including the subscription information of the terminal, and
   wherein whether the requested slice is allowed for the terminal and whether the requested slice is the slice for the NSAC is determined based on the subscription information of the terminal.

6. The method of claim 1, further comprising:
   in case that the PDU session is released, determining that the requested slice is a rejected slice; and
   transmitting, to the terminal, information indicating that the requested slice is the rejected slice.

7. The method of claim 1, further comprising:
   receiving, from the terminal, a request message for establishing a new PDU session including the information on the requested slice;
   in case that the terminal of the requested slice is exempt from the NSAC for the PDU session, determining that the new PDU session is not allowed for the requested slice; and transmitting, to the terminal, a reject message as a response to the request message.

8. An access and mobility management function (AMF) in a communication system, the AMF comprising:
a transceiver; and
a controller coupled with the transceiver and configured to:
receive, from a terminal, a registration request message for a protocol data unit (PDU) session, the registration request message including information on a requested slice associated with the PDU session,
determine whether the requested slice is a slice for a network slice admission control (NSAC),
in case that the requested slice is the slice for the NSAC, determine whether the terminal of the requested slice is exempt from the NSAC for the PDU session,
in case that the terminal of the requested slice is exempt from the NSAC for the PDU session, determine whether the requested slice is allowed for the terminal, and
in case that the request slice is allowed for the terminal, to the terminal, a registration accept message including information indicating that the requested slice is allowed.

9. The AMF of claim 8, wherein the controller is further configured to:
transmit, to a network slice admission control function (NSACF), a request message for requesting whether the terminal of the requested slice is allowed for the NSAC,
receive, from the NSACF, a response message including information indicating at least one of whether the terminal of the requested slice is allowed for the NSAC or whether the terminal of the requested slice is exempt from the NSAC for the PDU session, and
determine whether the terminal of the requested slice is exempt from the NSAC for the PDU session based on the information indicating the at least one of whether the terminal of the requested slice is allowed for the NSAC or whether the terminal of the requested slice is exempt from the NSAC for the PDU session.

10. The AMF of claim 9, wherein the controller is further configured to:
transmit, to the NSACF, a message for subscribing to an event based on the information indicating at least one of whether the terminal of the requested slice is allowed for the NSAC or whether the terminal of the requested slice is exempt from the NSAC for the PDU session,
wherein the event requests information indicating that the terminal of the requested slice is allowed when the requested slice is to be allowed,
receive, from the NSACF, the information indicating that the terminal of the requested slice is allowed based on a number of terminals for the requested slice,
determine that the requested slice is allowed based on the number of terminals for the requested slice and discard the information indicating that the requested slice is allowed based on the terminal of the requested slice is exempt from the NSAC for the PDU session, and
transmit, to the terminal, the information indicating that the requested slice is allowed.

11. The AMF of claim 10, wherein the controller is further configured to:
receive, from the terminal, a request message for establishing a new PDU session, the request message including the information on the requested slice,
determine that the requested slice is allowed for the new PDU session, and
transmit, to the terminal, an accept message as a response to the request message.

12. The AMF of claim 8, wherein the controller is further configured to:
transmit, to a unified data management (UDM), a request message for requesting subscription information of the terminal, and
receive, from the UDM, a response message including the subscription information of the terminal, and
wherein whether the requested slice is allowed for the terminal and whether the requested slice is the slice for the NSAC is determined based on the subscription information of the terminal.

13. The AMF of claim 8, wherein the controller is further configured to:
in case that the PDU session is released, determine that the requested slice is a rejected slice, and
transmit, to the terminal, information indicating that the requested slice is the rejected slice.

14. The AMF of claim 8, wherein the controller is further configured to:
receive, from the terminal, a request message for establishing a new PDU session including the information on the requested slice,
in case that the terminal of the requested slice is exempt from the NSAC for the PDU session, determine that the new PDU session is not allowed for the requested slice, and
transmit, to the terminal, a reject message as a response to the request message.

* * * * *